United States Patent [19]

Sollars

[11] Patent Number: 5,966,529

[45] Date of Patent: Oct. 12, 1999

[54] PROCESSOR HAVING AUXILIARY OPERAND REGISTER FILE AND COMPLEMENTARY ARRANGEMENTS FOR NON-DISRUPTIVELY PERFORMING ADJUNCT EXECUTION

[75] Inventor: Donald Sollars, Milpitas, Calif.

[73] Assignee: ZSP Corporation, Santa Clara, Calif.

[21] Appl. No.: 08/440,993

[22] Filed: May 15, 1995

[51] Int. Cl.[6] ............................................. G06F 12/10
[52] U.S. Cl. ............................ 395/569; 395/393; 395/591; 395/733
[58] Field of Search ................................ 395/375, 656, 395/800, 733, 569, 393, 591

[56] References Cited

U.S. PATENT DOCUMENTS

| | | |
|---|---|---|
| 4,038,533 | 7/1977 | Dummermuth et al. ........... 235/151.11 |
| 4,071,887 | 1/1978 | Daly et al. . |
| 4,354,228 | 10/1982 | Moore et al. . |
| 4,434,461 | 2/1984 | Puhl ........................................ 395/733 |
| 4,488,227 | 12/1984 | Miu et al. ............................... 395/375 |
| 4,766,566 | 8/1988 | Chuang . |
| 4,965,801 | 10/1990 | Dulac . |
| 5,062,073 | 10/1991 | Masuda et al. . |
| 5,083,263 | 1/1992 | Joy et al. . |
| 5,159,678 | 10/1992 | Wengelski et al. . |
| 5,179,530 | 1/1993 | Genusov et al. . |
| 5,313,648 | 5/1994 | Ehlig et al. ............................. 395/569 |
| 5,386,563 | 1/1995 | Thomas .................................. 395/650 |
| 5,398,322 | 3/1995 | Marwood . |
| 5,467,459 | 11/1995 | Alexander et al. . |
| 5,493,687 | 2/1996 | Garg et al. ............................. 395/800 |
| 5,495,615 | 2/1996 | Nizar et al. . |
| 5,513,366 | 4/1996 | Agarwal et al. . |
| 5,517,648 | 5/1996 | Bertone et al. . |
| 5,535,404 | 7/1996 | Tsubota . |
| 5,546,554 | 8/1996 | Yung et al. ............................. 395/413 |
| 5,553,301 | 9/1996 | New et al. . |
| 5,586,275 | 12/1996 | Ehling et al. . |
| 5,611,064 | 3/1997 | Maund et al. . |
| 5,630,102 | 5/1997 | Johnson et al. . |
| 5,644,732 | 7/1997 | Davidson ............................... 395/284 |
| 5,734,874 | 3/1998 | Van Hook et al. ..................... 395/513 |

OTHER PUBLICATIONS

Blinowski, G.J., Institute of Computer Science, Warsaw U. of Tech., Warsaw, Poland, *A Shared Memory Model Based on the Dataflow Paradigm*, 1995 IEEE.

Tremblay, Marc, et al., Proc. of the 28th anual Hawaii Intl. Conf. on System Sciences—1995, *A Three Dimensional Register File for Superscalar Processors*, 1995 IEEE.

Uffenbeck (Microcomputers and Microprocessors) Prentice– Hall, Inc.; pp. 51–52, 1985.

Motorola "Enhanced 32–bit microprocessor user's manual" 8–6 to 8–7 and 10–1 to 10–3, 1989.

DEC "DECchip 21064–AA Microprocessor Hardware reference manual" 3–1 to 3–2, 1992.

*Primary Examiner*—Thomas C. Lee
*Assistant Examiner*—Gautam R. Patel
*Attorney, Agent, or Firm*—Pillsbury Madison & Sutro, LLP

[57] ABSTRACT

A processor having a virtually addressable primary operand register file (PORF) is further provided with an auxiliary operand register file (AORF) to facilitate non-disruptive adjunct Execution. Preferably, the processor is further provided with basic and extended interrupt/exception (I/E) microcode as well as an AORF stack for recursively making available the AORF to the I/E service routines (ISR/ESR), utilizing the AORF stack, for nested servicing of I/E's. In some embodiments, the processor is further provided with micro-trap microcode, a first writable control store facility (WCSF), first auxiliary execution units (AEU) and multiple micro-trap service routines of a first and a second type comprising a number of uniterruptable series' of micro operations for performing complex tasks, leveraging the AORF and optionally the first AEU's. Lastly, in some embodiments, the processor is further/alternatively provided with macro-trap microcode, second WCSF, second AEU's and macro library routines of a first and a second type comprising a number of interruptable series' of operations for performing frequently performed tasks, leveraging the AORF and optionally the second AEU's. As a result, the processor is particularly suited for real-time/DSP systems.

40 Claims, 8 Drawing Sheets

PROCESSOR HAVING AUXILIARY OPERAND REGISTER FILE AND COMPLEMENTARY ARRANGEMENTS FOR NON-DISRUPTIVELY PERFORMING ADJUNCT EXECUTION

BACKGROUND OF THE INVENTION

1. Field of the Invention

The present invention relates to the field of computer systems. More specifically, the present invention relates to registers and execution units of processors of computer systems.

2. Background Information

In copending U.S. Pat. application, Ser. No.: 08/401,411, still pending, filed Mar. 9, 1995, a processor having a scalable, uni/multi-dimensional, virtually/physically addressed operand register file is disclosed. Various upward compatible embodiments, scaled to various performance design points suitable for multi-scalar, vector, and/or multi-processing as well as software pipelined load, calculate, and store processing, can be created for the disclosed processor. Software pipelined load, calculate, and store processing is particularly useful for real-time and/or digital signal processing (DSP) applications.

Real-time/DSP systems are also characterized by the requirement of having to respond to asynchronous events frequently and quickly. The execution model of a real-time/DSP system is based upon a task executing in the foreground (FG), while other tasks are executing in the background (BG). When one of these BG tasks completes, an interrupt request is generated in which the processor is asked to execute a series of instructions that may be completely unrelated to the current task at hand. Typically, the series of instructions to be executed is relatively short. For each of these requests, a processor particularly suited for real-time/DSP applications must be able to respond quickly, perform the required task, and then swiftly resume the interrupted task at the point that it had left off.

Servicing of an interrupt will typically require allocation and storage of local variables by the interrupt service routine (ISR). Conventional approaches to servicing interrupts typically require the ISR to use the same general purpose operand registers used by the executing FG/BG tasks. Thus, for each interrupt, before a subset of the operand registers can be used by the ISR, the content of the operand registers must be saved, and upon servicing the interrupt, their saved contents must be restored. For multi-processing systems, where registers are associated with executing contexts, certain status information of the interrupted context must also be saved before execution control can be transferred to the ISR, and restored upon returning from the ISR. Therefore, it would be desirable if a more efficient approach can be provided to the processor disclosed in the copending application for servicing the frequent and typically short interrupts of real-time/DSP applications.

Likewise, real-time/DSP applications are also characterized by the requirement of having to respond to execution exceptions quickly. Servicing execution exceptions has virtually all the characteristics and requirements of servicing interrupts. Many exceptions raised during execution of real-time/DSP applications can be remedied with a relatively small number of instructions also. Conventional approaches typically service exceptions in the manner interrupts are serviced, thus suffering the same disadvantages described earlier. Therefore, it would be desirable if a more efficient approach can also be provided to the processor disclosed in the copending application for servicing the relatively short exception processing of real-time/DSP applications.

Many complex real-time/DSP applications are further characterized by processing of large data sets. Thus, vector processors are often employed for these applications. However, there is still a significant amount of companion scalar processing that must be performed. Conventional vector processors typically make little provision for supporting scalar processing, thus causing scalar processing and the switching between scalar and vector processing to be performed inefficiently. Therefore, it would be desirable if a more efficient approach can be provided to the processor disclosed in the copending application for performing the companion scalar processing of vectorized real-time/DSP applications.

Many complex real-time/DSP applications are further characterized by the complexity of the operations they perform, such as calculating the COSINE and SINE of various variables, as well as the frequency of the operations they perform, such as performing Fast Fourier Transforms. Typically, these calculations are performed using software library routines. Similar to servicing interrupts/exceptions, conventional approaches also require the software library routines to use the same general purpose operand registers used by the executing FG/BG tasks, thus suffering the same disadvantages described earlier. Furthermore, it would be desirable if native hardware support can be provided for these complex and frequent operations in the higher end models of the performance spectrum. Unfortunately, in order to maintain compatibility, prior art architectures typically do not allow the high end models to do so without also burdening the lower end models to provide the same. Therefore, it would be desirable if a more efficient and scalable approach can be used to allow the processor disclosed in the copending application to provide native hardware support for these complex and frequent operations of real-time/DSP applications.

Lastly, like other applications, real-time/DSP applications can also benefit from the ability of emulating instructions of other architectures as new technology emerges, to preserve the large amount of user investment in their existing real-time/DSP code. Conventional processors typically provide no support for emulating instructions of other existing architectures, making it difficult and costly to exploit the new technology. Therefore, it would be further desirable if a more effective approach can be used to allow the processor disclosed in the copending application to emulate instructions of other existing architectures, making it easier to "convert" existing real-time/DSP applications, and allowing the "converted" real-time/DSP applications to exploit the new technologies.

As will be disclosed in more detail below, these and other desirable results are advantageously achieved by the auxiliary operand register file and its complementary arrangements of the present invention for non-disruptively performing adjunct Execution in the processor disclosed in the copending application.

SUMMARY OF THE INVENTION

A processor having a virtually addressable primary operand register file (PORF) is further provided with an auxiliary operand register file (AORF) for non-disruptively supporting execution adjunct to the "mainline" execution being performed using the PORF. The AORF is normally unavailable to executing instructions, and it is made temporarily available to executing instructions on-demand, as a substitute for the PORF. The AORF is made temporarily available by redirecting mapping of virtual operand register addresses from the PORF space to the AORF space, and then subsequently redirecting the mapping back to the PORF space. The arrangement may be leveraged to efficiently perform concurrent foreground/background or context/sub-context processing, such as companion scalar processing concurrent with vector processing being performed using the PORF.

In some embodiments, in addition to the AORF, the processor is further provided with basic interrupt/exception (I/E) microcode that temporarily makes available the AORF to an I/E service routine (ISR/ESR), in response to an I/E, for quickly servicing the I/E. For some of these embodiments, the basic I/E microcode further automatically makes available in the AORF the state of the exception raising context at the time of the exception to an ESR. For some of these embodiments, the processor is further provided with an AORF stack having sufficient capacity to store multiple AORF frames, and extended I/E microcode for facilitating nested I/E servicing.

In some embodiments, in addition to the AORF, the processor is further provided with micro-trap microcode and a first writable control store facility (WCSF) having micro-trap service routines (MSR) of a first type. Each of these MSR's of the first type comprises a series of uninterruptable micro operations for performing a complex task of a first type, such as emulating an instruction of another architecture, leveraging the AORF. The first WCSF is normally unavailable to the instruction fetch unit (IFU), and is made temporarily available to the IFU (in lieu of the normal instruction space) in response to a micro-trap. Atomicity of operation is guaranteed for each series of uninterruptable micro operations. For some of these embodiments, the processor is further provided with first auxiliary execution units (AEU) and alternative/additional "implementor-defined" MSR's of a second type. Each of these MSR's of the second type also comprises a series of uninterruptable micro operations for performing complex tasks of a second type, such as computing complex mathematical functions, leveraging the AORF and the first AEU's. The first AEU's provide native hardware support for non-standard instructions of the uninterruptable micro operations. The first AEU's are also normally unavailable to the IFU, and are made available to the IFU in response to a micro-trap.

In some embodiments, in addition to the AORF, the processor is further provided with macro-trap microcode and a second WCSF having macro library routines (MLR) of a first type. Each of these MLR's comprises a series of interruptable operations for performing a frequently performed task of a first type, such as context switching performed by an operating system, leveraging the AORF. The second WCSF is also normally unavailable to the IFU, and is made temporarily available to the IFU (concurrent with the normal instruction space), in response to a macro-trap. For some of these embodiments, the processor is further/alternatively provided with second AEU's and alternative/additional "implementor-defined" MLR's of a second type. Each of these MLR's of the second type also comprises a series of interruptable operations for performing a frequently performed operation of a second type, such as Fast Fourier Transform performed by a DSP application, leveraging the AORF and the second AEU's. The second AEU's provide native hardware support for non-standard instructions of the interruptable operations. The second AEU's are also normally unavailable to the IFU, and are made available to the IFU in response to a macro-trap.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, the essential elements of the present invention will be described first, and then various exemplary utilization will be described. For purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
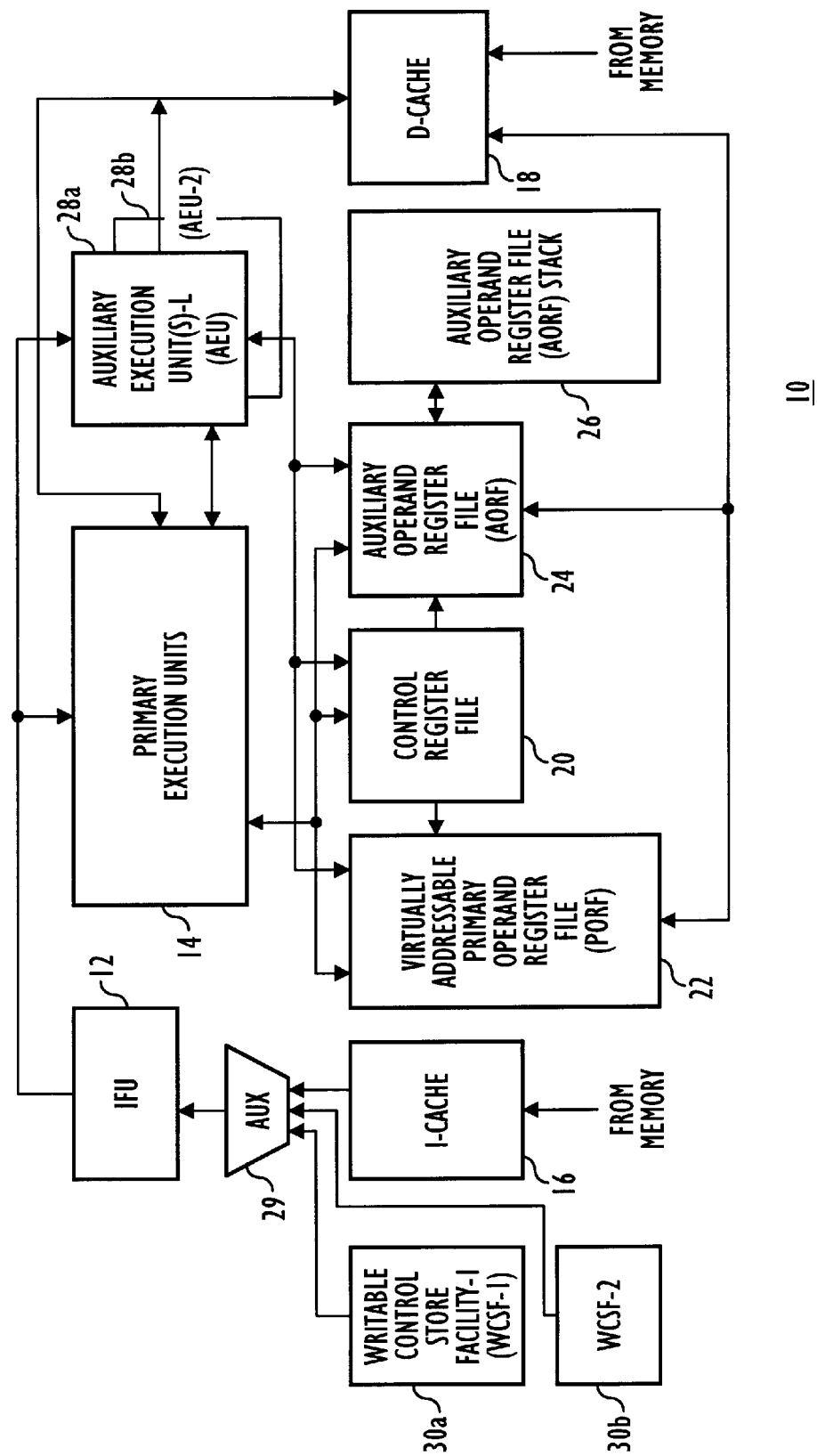
FIG. 1 illustrates the processor of the present invention.

Referring now to FIG. 1, the major functional blocks of processor 10 of the present invention are illustrated. Processor 10 includes instruction fetch unit (IFU) 12, primary execution units 14, instruction and data caches (I-cache and D-cache) 16 and 18, control register file 20 and primary operand register file (PORF) 22 coupled to each other as shown. Additionally, in accordance with the teachings of the present invention, processor 10 is further provided with auxiliary operand register file (AORF) 24. Preferably, processor 10 is further provided with basic interrupt/exception microcode, AORF stack 26, as well as extended interrupt/exception microcode. In some embodiments, processor 10 is further provided with micro-trap microcode and first WCSF 30a storing "implementor-defined" micro-trap service routines (MSR) of a first type. For some of these embodiments, processor 10 is further provided with first AEU's 28a and alternative/additional "implementor-defined" MSR's of a second type stored in first WCSF 30a. In some embodiments, processor 10 is further/alternatively provided with macro-trap microcode and second WCSF 30b storing "implementor-defined" macro library routines (MLR) of a first type. For some of these embodiments, processor 10 is further provided with alternative/additional second AEU's 28b and alternative/additional "implementor-defined" MLR's of a second type stored in second WCSF 30b. For those embodiments having first and/or second WCSF 30a and/or 30b, processor 10 is further provided with MUX 29.

Except for the elements provided in accordance with the teachings of the present invention, processor 10 is described in detail in the above mentioned copending application, which is hereby fully incorporated by reference. Nevertheless, key aspects of the basic elements of processor 10 will be briefly re-highlighted below, before the newly provided elements of the present invention are described in detail below, with additional references to the remaining figures.

As disclosed, various upward compatible embodiments of processor 10, scaled to various performance design points suitable for multi-scalar, vector, and/or multi-processing as well as software pipelined load, calculate, and store processing, can be created. In all embodiments, PORF 22 includes a number of operand registers, and they are referenced by instructions with virtual or physical source and destination addresses of variable addressing dimensions. Primary execution units 14 include at least one address mapping circuit that maps the uni-dimensional virtual and the multi-dimensional virtual/physical source and destination addresses to their uni-dimensional physical equivalents. Preferably, at least three address mapping circuits are provided to facilitate concurrent mapping of one destination and two source addresses.

For a particular embodiment, the number of operand registers (N) provided and the largest number of addressing dimensions (n) employable by the referencing source/destination addresses are predetermined. Typically, N is scaled proportionally to n. Each instruction may reference the N operand registers virtually, using up to n−1 addressing dimensions, i.e. 1-D, 2-D, ... or (n−1)-D virtual addresses, or physically, using up to n addressing dimensions, i.e. 1-D, 2-D, ... or n-D physical addresses. Up to v1 virtual files of v2, v3×v4, v5×v6×v7 ... virtual operand registers are available under 1-D, 2-D, 3D ... virtual addressing respectively; whereas one physical file of N, p1×p2, p3×p4×p5 ... physical operand registers are available under 1-D, 2-D, 3-D ... physical addressing respectively (v's and p's are factors of N). In some embodiments, v's and p's are all geometric factors of $(N)^{1/n}$, i.e. $(N)^{1/n}$, $(N)^{2/n}$, $(N)^{3/n}$ etc. The size of the instructions is also predetermined. Typically, it is also scaled proportionally to N and n.

Each virtual source/destination address is provided to an address mapping circuit in n−1 predetermined ordered portions, whereas each physical source/destination address is provided to an address mapping circuit in n predetermined ordered portions. Along with each virtual source/destination address, an address mapping circuit is further provided with a base operand register address as the nth ordered portion. Typically, the base operand register address is stored in a control register of control register file 20. Additionally, along with each source/destination address, an address mapping circuit is further provided with the addressing dimension of the source/destination address. Accordingly, the address mapping circuit maps the uni/multi-dimensional virtual/physical source/destination address to its uni-dimensional physical equivalent by selectively translating and/or combining the various ordered portions, and then summing the translated and/or combined portions.

In some embodiments, whether a source/destination address is a virtual or a physical address is implicitly inferred from the instruction type, whereas in other embodiments, it is explicitly specified. In some embodiments, source and destination addresses of an instruction are either all virtual addresses, or all physical addresses, whereas in other embodiments, the source/destination addresses include virtual as well as physical addresses. In some embodiments, the addressing dimension of an instruction's source and destination addresses is specified in the instruction, whereas, in other embodiments, it is specified in a control register of the processor. In some embodiments, all n−1 portions of a virtual and all n portions of a physical source/destination address are specified in an instruction, whereas, in other embodiments, one or more higher ordered portions are specified through control registers of the processor.

Continuing to refer to FIG. 1, as will be described in more detail below, AORF 24 is used as a "scratch" register file for non-disruptively performing adjunct execution. AORF 24 is normally unavailable to executing instructions, and it is made temporarily available to executing instructions on-demand, as a substitute for the PORP 22. AORF is made temporarily available by redirecting mapping of virtual operand register addresses from the PORF space to the AORF space, and then subsequently redirecting the mapping back to the PORF.

For those embodiments also provided with basic I/E microcode, AORF 24 is made available to ISRs/ESRs in response to interrupts/exceptions for quickly servicing the interrupts/exceptions. For those embodiments also provided with AORF stack 26 and extended I/E microcode, AORF stack 26 is used by extended I/E microcode for facilitating nested interrupt/exception servicing.

For those embodiments also provided with micro-trap microcode and first WCSF 30a having MSR's, with or without first AEU's 28a, first WCSF 30a and first AEU's 28a (if present) are temporarily made available (in lieu of I-Cache 16 but concurrently with primary execution units 14) to IFU 12 in response to micro-traps, while the micro-traps are being "serviced". AORF 24 is further dynamically made available (in lieu of PORF 22) to the MSR's in response to micro-traps, while the micro-traps are being "serviced". Each of the MSR's of the first type comprises a series of uninterruptable micro operations for performing a complex task of a first type, such as emulating an instruction of another architecture, leveraging AORF 24. Each of the MSR's of the second type also comprises a series of uninterruptable micro operations for performing a complex task of a second type, such as calculating a mathematical function, leveraging AORF 24 and first AEU's 28a. For the purpose of this disclosure, a micro-trap is a special kind of interrupt, where atomicity of the "service" operation is guaranteed. Atomicity means the state of processor 10 effectively would appear unchanged before and after the micro-trap is "serviced", except for the state changes that are meant to be effectuated through the successful execution of the micro-trap. In other words, processor 10 is placed into an alternate execution model, while a micro-trap is being "serviced"; thereby allowing the basic instruction set architecture (ISA) of processor 10 to be easily extended in a scalable manner in the higher end models of the performance spectrum without burdening the lower end models.

For those embodiments also provided with macro-trap microcode and second WCSF 30b having MLRs, with or without second AEU's 28b, in like manner, second WCSF 30b and second AEU's 28b (if present) are temporarily made available (concurrent with I-Cache 16 and primary execution units 14) to IFU 12 in response to macro-traps, while the macro-traps are being "serviced". AORF 24 is further dynamically made available (in lieu of PORF 22) to MLRs in response to macro-traps, while the macro-traps are being "serviced". Each of the MLR's of the first type comprises a series of interruptable operations for performing a frequently performed task of a first type, leveraging AORF 24. Each of the MLR's of the second type comprises a series of interruptable operations for performing a frequently performed task of a second type, leveraging AORF 24 and second AEU's 28b. In other words, processor 10 is also placed into another alternate execution model, while a macro-trap is being "serviced"; thereby allowing frequently performed tasks to be easily optimized specifically for processor 10.

While for ease of explanation, MSR's and MLR's of both types are being described as leveraging AORF 24 when performing their respective uninterruptable/interruptable micro/standard operations, based on the descriptions to follow, it will be appreciated by those skilled in the art that the present invention may also be practiced with some of the MSR's and MLR's performing their respective operations without actually leveraging AORF 24.

Figure 2:
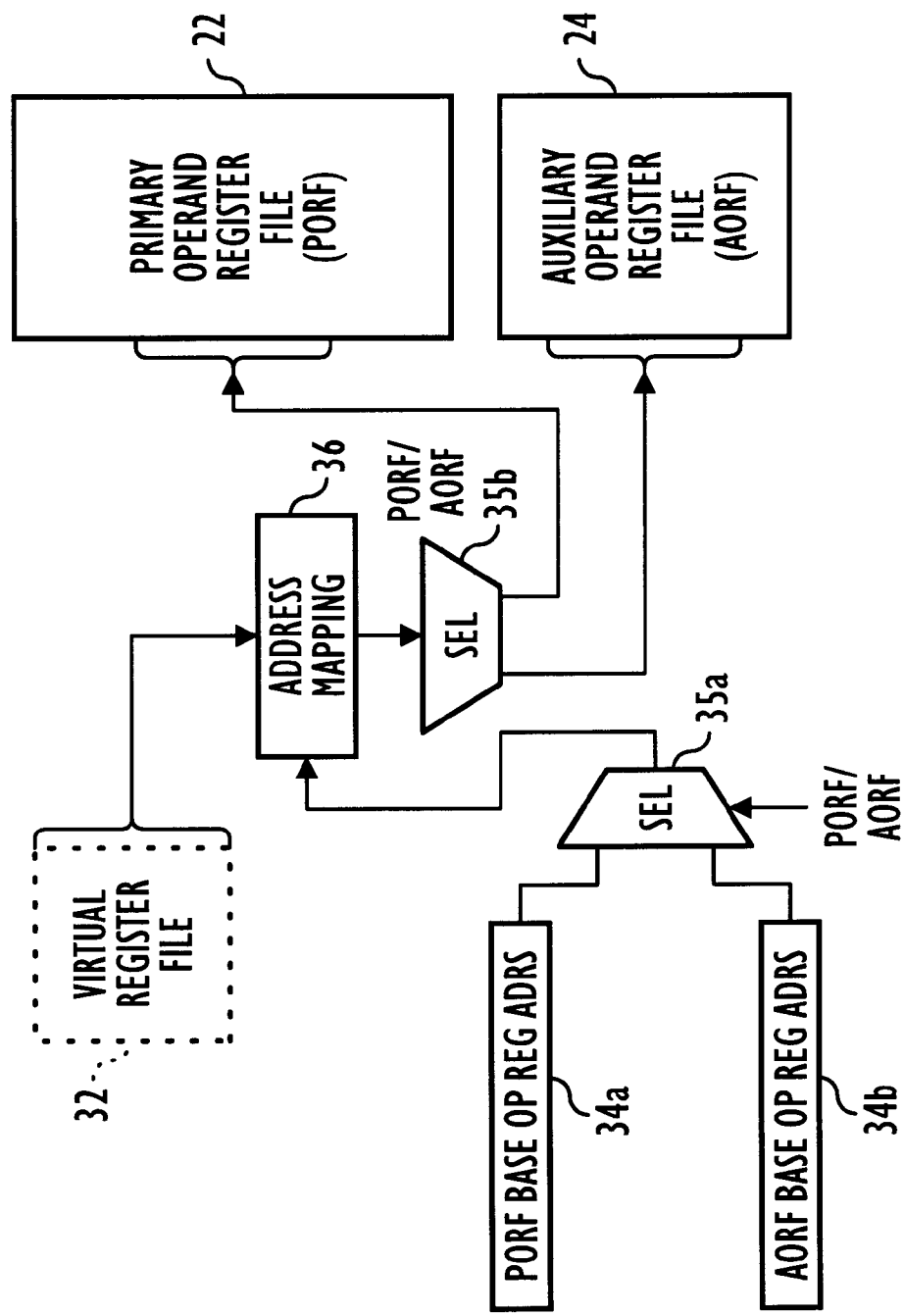
FIG. 2 illustrates selective mapping of virtual operand register addresses into the primary operand register file and the auxiliary operand register file of FIG. 1.

FIG. 2 illustrates selective mapping of virtual operand register addresses into PORF 22 and AORF 24 of the present invention. During normal operation, in accordance with the present invention, a PORF/AORF indicator (such as a status flag) is set to denote mapping into the PORF space. As described earlier, a virtual operand register address pointing to a virtual operand register of a virtual operand register file 32, along with the base operand register address stored in a "PORF" base operand register address register 34a, are provided to address mapping circuitry 36. Accordingly, the address mapping circuitry 36 maps the virtual operand register to a corresponding physical operand register in PORF 22. However, in accordance with the present invention, whenever the PORF/AORF mapping indicator is set to denote mapping into the AORF space, a virtual operand register address pointing to a virtual operand register of a virtual operand register file 32, along with a base operand register address stored in a "AORF" base operand register address register 34b, are provided to address mapping circuitry 36 instead. Accordingly, the address mapping circuitry 36 maps the virtual operand register to a corresponding operand register in AORF 24 instead. Mapping into PORF 22 is resumed once the PORF/AORF mapping indicator is reset back to denote mapping into the PORF space. Thus, by controlling the PORF/AORF mapping indicator, mapping into PORF 22 and AORF 24 may be selectively made on demand.

Figure 6:
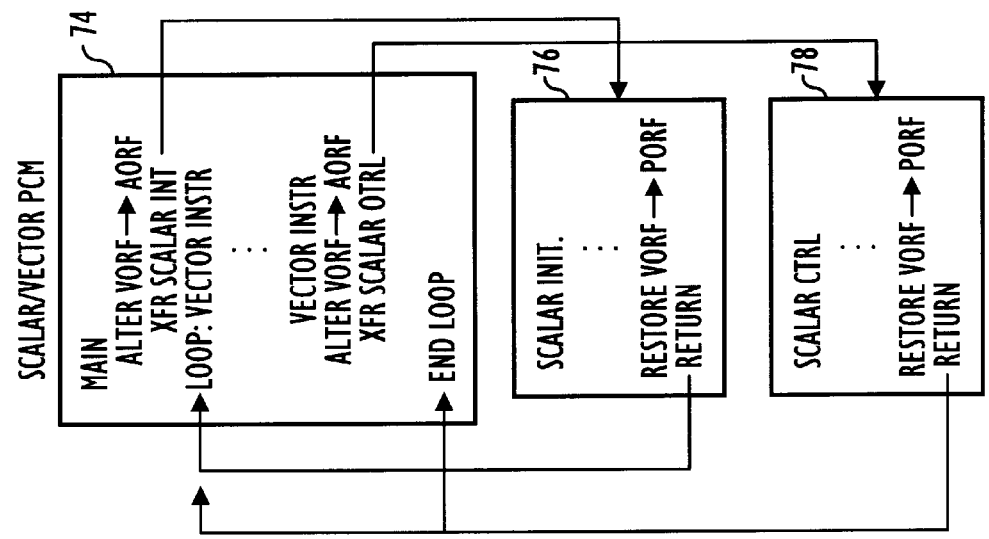
FIG. 6 illustrates companion scalar processing utilizing the present invention.

We skip now to FIG. 6, wherein AORF 24 is leveraged to efficiently perform companion scalar processing concurrently with vector processing using PORF 22. As shown, a scalar initialization sub-program 76 and a scalar control sub-program 78 are provided to complement the main vector processing program 74. Vector processing program 74 would cause virtual operand register address mapping to be redirected to AORF 24, thereby making AORF 24 available to scalar initialization subprogram 76, and execution control to be forked thereto. Upon being given execution control, subprogram 76 would quickly initialize a number of scalar control variables before causing virtual operand register address mapping to be redirected back to PORF 22, and execution control to be transferred back to main program 74. Upon regaining execution control, main program 72 would continue its vector processing using PORF 22. At the end of each "pass", main program 72 would again cause virtual operand register address mapping to be redirected to AORF 24, thereby making AORF 24 available to scalar control subprogram 78, and execution control to be forked thereto. Upon being given execution control, subprogram 78 would quickly recompute the scalar control variables, determine whether to continue or stop vector processing, and cause execution control to be returned to the main program 74 accordingly.

As will be appreciated by those skilled in the art, besides companion scalar processing, the ability to selectively map virtual operand registers into either PORF 22 and AORF 24 may be leveraged to efficiently perform other concurrent foreground/background or context/sub-context processing. In particular, as will be disclosed in more detail below, the ability to selectively map virtual operand registers into either PORF 22 and AORF 24 enables AORF 24 to be made available to an ISR/ESR to quickly service an interrupt/ exception or an "implementor-defined" MSR to quickly perform a series of uninterruptable micro operations of a complex task, or an "implementor-defined" MLR to efficiently perform a series of interruptable operations of a frequently performed task.

Figure 3:
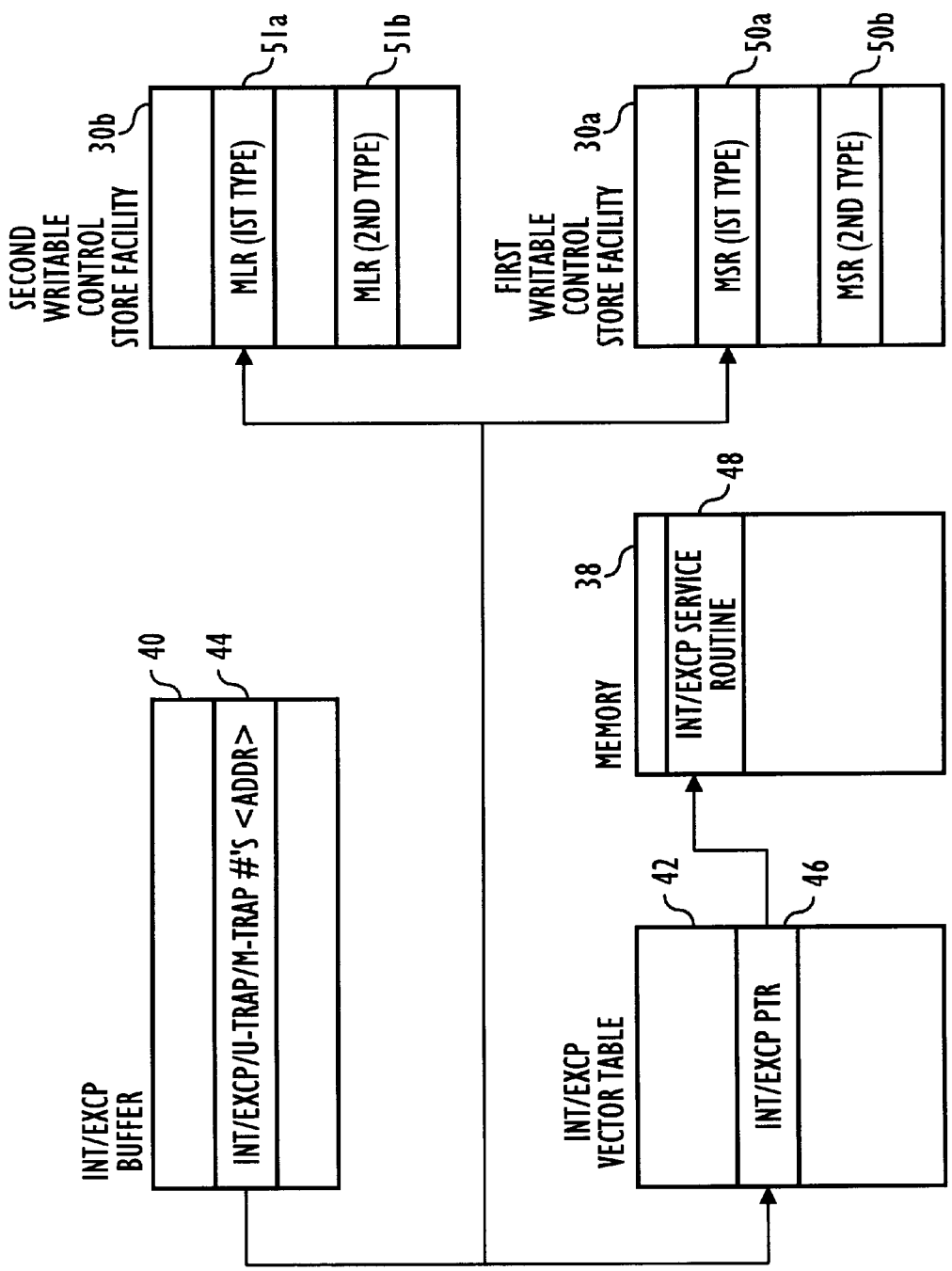
FIG. 3 illustrates invocation of interrupt/exception service routines and micro-trap service microcode.

FIG. 3 illustrates invocation of ISRs/ESRs. FIG. 3 also illustrates invocation of MSR's and MLR's, but their description will be deferred until later. As shown, detected interrupts and exceptions are stored in interrupt/exception buffer 40, which is part of the primary execution units 14. Each interrupt or exception 44 has an identifying number. Before executing each instruction, the primary execution units 14 check buffer 40 to determine if any interrupts/ exceptions are waiting to be serviced. If at least one interrupt/exception 44 is waiting to be serviced, basic I/E microcode invokes the appropriate ISR/ESR 48 in memory 38 to service the interrupt/exception 44. The appropriate ISR/ESR 48 is located indirectly through the ISR/ESR pointers 46 stored in an interrupt/exception vector table 42 in memory.

Figure 4B:
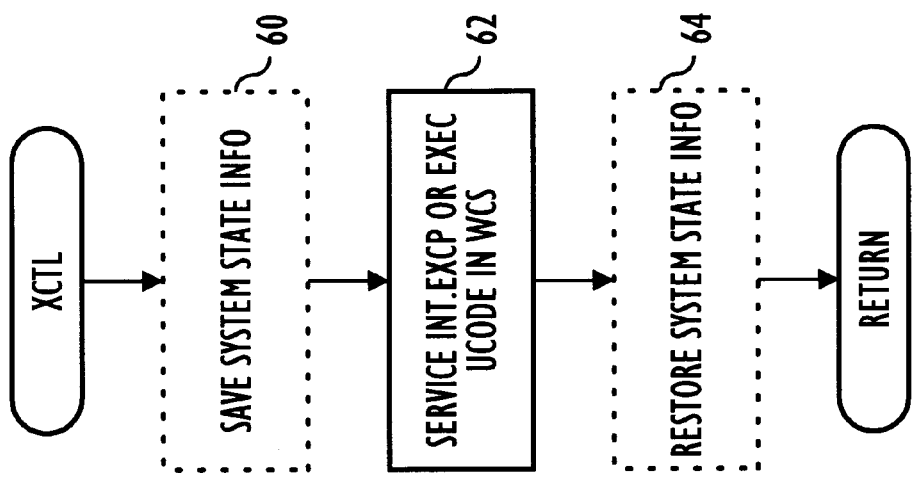
FIGS. 4a–4c illustrate the operating flow of the basic and extended interrupt/exception microcode.
Figure 4A:
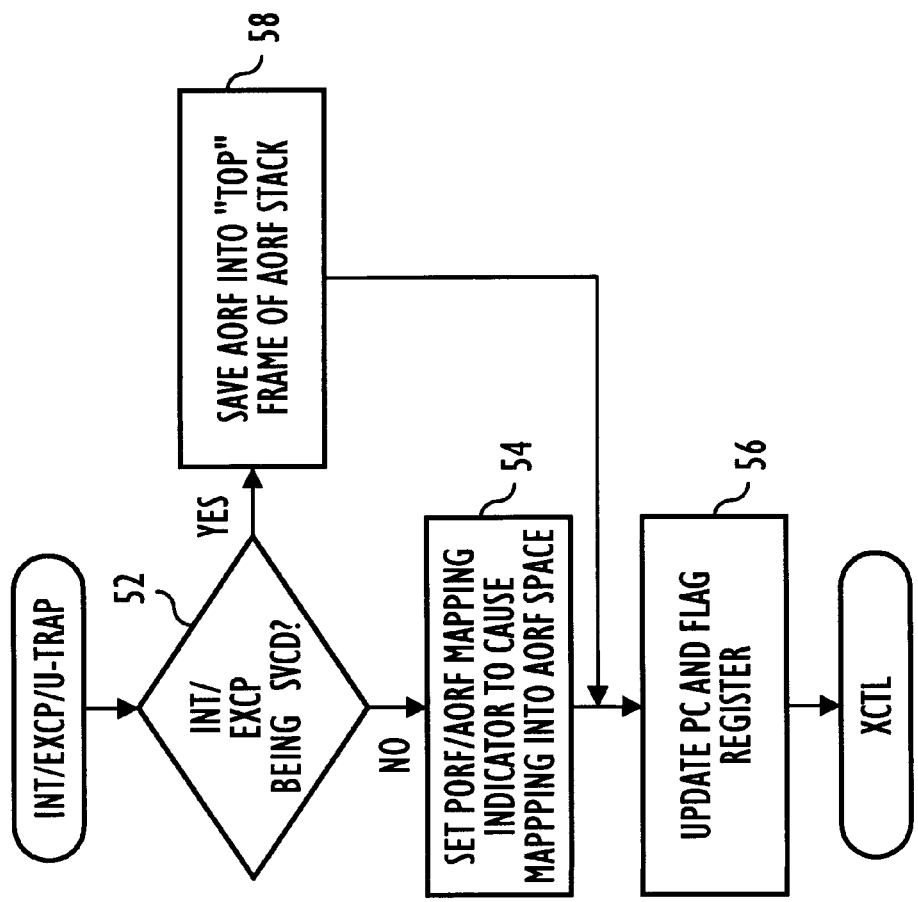
Figure 4C:
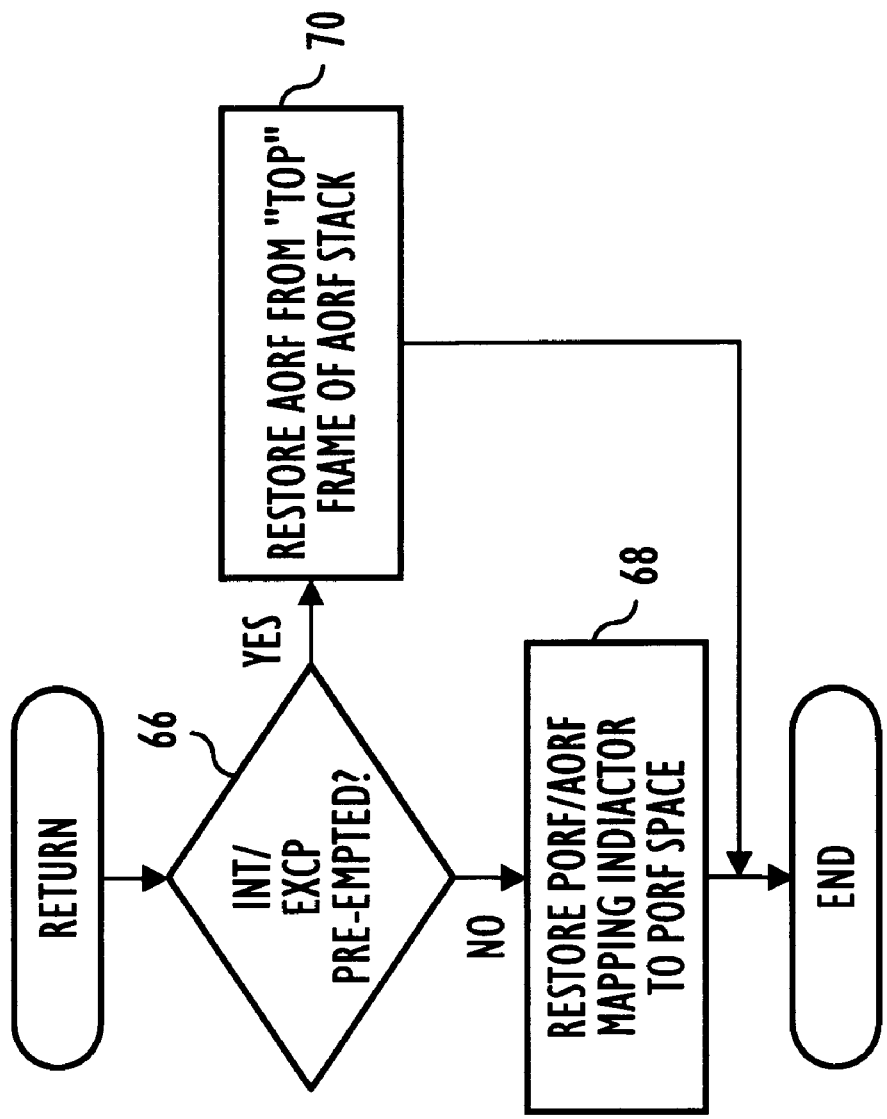

FIGS. 4a–4c illustrate the operational flow for servicing an interrupt/exception. FIGS. 4a–4c also illustrate the operational flow for nested servicing of interrupts/exceptions, as well as servicing of a micro-trap. More specifically, steps 52 and 58 of FIG. 4a, and steps 66 and 70 of FIG. 4c are performed in embodiments where nested servicing of interrupts/exceptions is supported. Their description will also be deferred until later.

As shown in FIG. 4a, in response to an interrupt/ exception, basic I/E microcode causes mapping of virtual operand register addresses into PORF 22 to be temporarily redirected to the AORF 24 instead, by properly setting the PORF/AORF mapping indicator, step 54. Basic I/E microcode further causes execution to fork to the appropriate ISR/ESR 48 by updating the PC in the appropriate control register, step 56. Basic I/E microcode may also set or update one or more of the flag registers in control register file 20, e.g. denoting interrupt/exception service is "in progress".

As shown in FIG. 4b, upon being given execution control, depending on the nature of the interrupt/exception, in particular, whether the particular ISR/ESR 48 will modify any of the state information of the interrupted or exception raising context, the ISR/ESR 48 may optionally save the system state information of the context, step 60. Upon saving the proper state information, the ISR/ESR 48 proceeds to service the interrupt/exception quickly, step 62. Data may be moved between the AORF 24 and PORF 22 using MOV instructions of processor 10 having hybrid source/destination addresses (i.e. both virtual and physical operand register addresses). Upon servicing the interrupt/ exception, the ISR/ESR 48 may restore the system state information of the interrupted or exception raising context, if it has previously saved and subsequently modified the state information, step 64.

Finally, as shown in FIG. 4c, as part of the process of returning to the interrupted or exception raising context, the basic I/E microcode causes mapping of virtual operand register addresses 34 to be redirected back to PORF 22, by restoring the PORF/AORF mapping indicator, step 68. The basic I/E microcode may further reset or update one or more of the flag registers in control register file 20, step 68.

For purposes of illustration, AORF 24 and basic I/E microcode may be leveraged by an ISR 48 for servicing a serial port of processor 10 operating at kilohertz frequencies. The serial port would be likely to assert an interrupt every few microseconds to request having its data read. Upon having AORF 24 made available and being given execution control, the ISR 48 would quickly and successively load the base address of the serial port, the serial port data and the destination memory address into various registers of AORF 24, store the serial port data into memory, and then exit. As will be appreciated by those skilled in the art, by carefully coordinating the "AORF" base operand register addresses among the various ISRs/ESRs, the contents of the desired registers of AORF may be made persistent across invocations, thereby eliminating the necessity to reload the "state" values upon invocation, and save the "state" values before exiting.

Referring back to FIG. 2 briefly, the state of AORF 24 when made available to an ISR/ESR 48 is implementation dependent. The AORF 24 may be in an undefined state, empty state, or a defined state. In some embodiments, the basic I/E microcode automatically makes available in AORF 24 the state of the exception raising context at the time of the exception to the ESR 48, by automatically copying the content of the virtual operand register file 32 of the exception raising context into the AORF 24.

Figure 5:
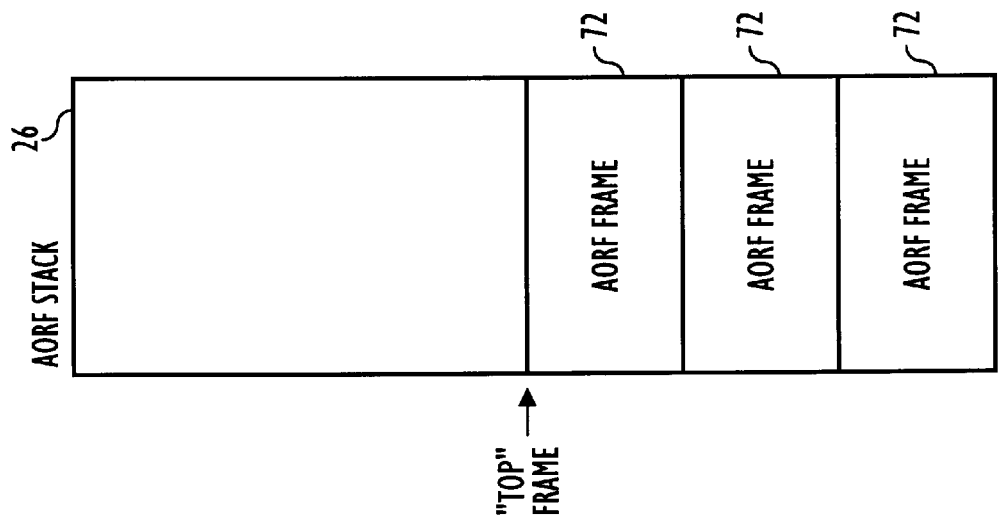
FIG. 5 illustrates the auxiliary operand register file stack in further detail.

FIG. 5 illustrates AORF stack 26 in further detail. As shown, AORF stack 26 comprises sufficient storage space for storing multiple frames 72 of AORF 24. Referring briefly back to FIGS. 4a and 4c, whenever an interrupt/exception is serviced, extended I/E microcode first checks to determine if the interrupt is interrupting a current interrupt/exception being serviced or the exception is caused while servicing a current interrupt/exception, step 52. If the interrupt is interrupting a current interrupt/exception being serviced or the exception is caused while servicing a current interrupt/exception, extended I/E microcode suspends servicing of the current interrupt/exception, pushes the current content of AORF 24 onto AORF stack 26, thereby making AORF 24 available to the ISR/ESR 48 of another interrupt/exception, step 58. Upon servicing each interrupt/exception, the extended I/E microcode determines if AORF stack 26 is non-empty, i.e. servicing of at least one interrupt/exception has been preempted, step 66. If AORF stack 26 is non-empty, extended I/E microcode pops back the most recently pushed down content of AORF 24 from AORF stack 26, step 70. Recursively, the extended I/E microcode ensures servicing for all interrupted interrupt/exceptions are resumed, before allowing the basic I/E microcode to reactivate mapping of virtual operand register addresses into PORF 22 (step 68).

Referring now briefly back to FIG. 1, as illustrated therein and described earlier, for some embodiments, in addition to AORF 24, processor 10 is further provided with micro-trap microcode and first WCSF 30a, with or without first AEU's 28a. For these embodiments, processor 10 is placed into an alternate execution model, with first WCSF 30a and first AEU's 28a (if present) being temporarily made available (in lieu of I-Cache 16 but concurrently with primary execution units 14) to IFU 12, in response to a micro-trap, while the micro-trap is being "serviced".

We skip now to FIG. 3 where the content of first WCSF 30a and "invocation" of the stored MSR's 50a–50b are illustrated. As shown and described earlier, first WCSF 30a is used to store MSR's of a first type 50a. Each of the MSR's of the first type 50a comprises a series of uninterruptable micro operations for performing a complex task of a first type, such as emulating an instruction of another architecture. First WCSF 30a is also used to store MSR's of a second type 50b. Each of the MSR's of the second type 50b comprises a series of uninterruptable micro operations for performing a complex task of a second type, such as performing mathematical calculations of a mathematical function. For these embodiments, I/E buffer 40 is also used to store micro-traps. Each micro-trap 44 includes a target address. In like manner, except for certain special micro-trap applications, the micro-trap microcode also causes mapping of virtual operand register addresses to be redirected from PORF 22 to AORF 24, in response to a micro-trap. The micro-trap microcode further makes first WCSF 30a and first AEU's 28a available to IFU 12, by setting/resetting status flag(s) in control register file 20. The micro-trap microcode further guarantees atomicity of operation to MSR's 50a–50b, by setting/resetting a status flag in control register file 20 denoting temporary disabling of "interrupt" servicing. Similarly, upon servicing a micro-trap, the micro-trap microcode causes mapping of virtual operand register addresses to be redirected back to PORF 22.

Figure 7:
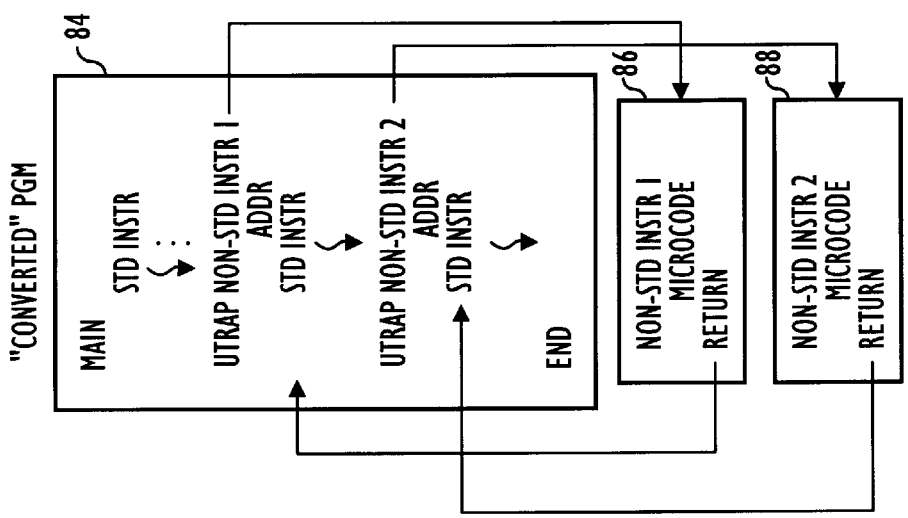

We skip further now to FIG. 7, wherein using micro-trap microcode, first WCSF 30a and AORF 24 of the present invention to emulate instructions of another architecture is illustrated. As shown, first and second exemplary MSR's 86 and 88 are provided to complement the main "converted" program 84. Exemplary MSR's 86 and 88 comprise first and second series of uninterruptable micro operations for emulating a first and a second instruction of another architecture. Main program 84 would cause a micro-trap whenever it needed to execute the first/second instruction of the other architecture. In each instance, first WCSF 30a would be made available to IFU 12. AORF 24 would be made available to the appropriate MSR 86 or 88, and execution control would be forked thereto after atomicity of operation had been caused to be guaranteed. IFU 12 would fetch instructions of MSR 86 or 88 from first WCSF 30a and dispatch them to primary execution units 14. MSR 86 or 88 would then perform the uninterruptable micro operations necessary to emulate the instruction of the other architecture before returning to main program 84. As will be appreciated by those skilled in the art, MSR 86 or 88 actually has to perform only those portions of operations that required atomicity and/or AORF 24 to emulate the target instruction. Additional interruptable non-micro operations may be performed inside main program 84 using PORF 22 to "completely" effectuate the emulation.

Figure 8:
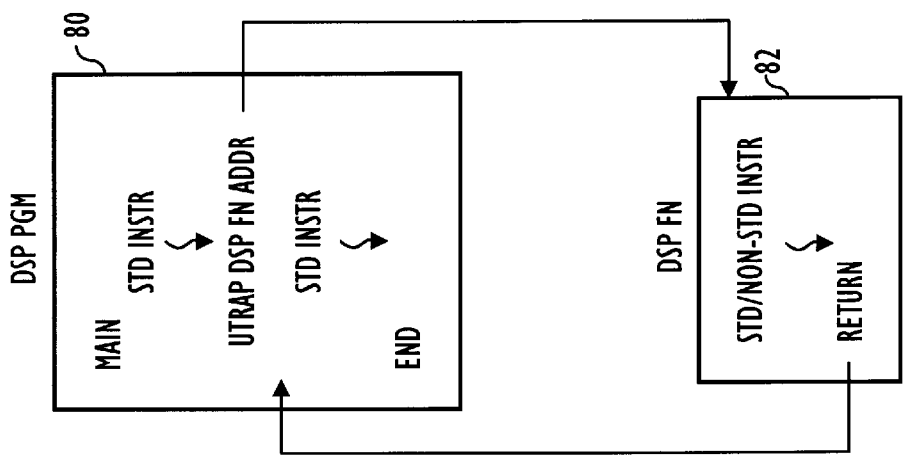
FIGS. 7–9 illustrate emulating instructions of other architectures, providing native hardware support for mathematical functions, and efficiently performing frequently performed tasks utilizing the present invention.

Referring now to FIG. 8, wherein using micro-trap microcode, first WCSF 30a, AEU's 28a, and AORF 24 of the present invention to calculate mathematical functions is illustrated. As shown, a digital signal processing (DSP) function MSR 82 is provided to complement the main DSP program 80. DSP function MSR 82 includes "non-standard" instructions that leverage the native hardware support for calculating mathematical functions, such as SINE and COSINE of a variable, provided by selected ones of first AEU's 28a. Main DSP program 80 would invoke a micro-trap, whenever it needed to perform the DSP function. In each instance, first WCSF 30a and first AEU's 28a would be made available to IFU 12. AORF 24 would be made available to the appropriate MSR 82, and execution control would be forked thereto after atomicity of operation had been caused to be guaranteed. IFU 12 would fetch instructions of MSR 82 from first WCSF 30a, and dispatch them to primary execution units 14 and first AEU's 28a as appropriate. MSR 82 would then perform the DSP function using standard instructions executable by primary execution units 14, as well as non-standard instructions executable only by first AEU's 28a. For these embodiments, IFU 12 is enhanced to dispatch non-standard instructions, i.e. those instructions that it does not know how to decode, to first AEU's 28a.

Referring now briefly back to FIG. 1 again, as illustrated therein and described earlier, for some embodiments, in addition to AORF 24, processor 10 is further provided with macro-trap microcode and second WCSF 30b, with or without second AEU's 28b. For these embodiments, processor 10 is placed into an alternate execution model, with second WCSF 30b and second AEU's 28b (if present) being temporarily made available (concurrent with IFU 12 and primary execution units 14) to IFU 12, in response to a macro-trap, while the macro-trap is being "serviced".

We skip now to FIG. 3 again where the content of second WCSF 30b and the "invocation" of the stored MLR's 51a and 51b is illustrated. As shown and described earlier, second WCSF 30b is used to store MLR's of a first type 51a. Each of the MLR's of the first type 51a comprises a series of interruptable operations for performing a frequently performed task of a first type, such as switching contexts by an operating system. Second WCSF 30b is further used to store MLR's of a second type 51b. Each of the MLR's of the second type 51b comprises a series of interruptable operations for performing a frequently performed task of a second type, such as Fast Fourier Transform performed by a DSP application. For these embodiments, I/E buffer 40 is also used to store macro-traps. Each macro-trap 45 also includes a target address. In like manner, except for certain special macro-trap applications, the macro-trap microcode also causes mapping of virtual operand register addresses to be redirected from PORF 22 to AORF 24, in response to a macro-trap. The macro-trap microcode further makes second WCSF 30b and second AEU's 28b available to IFU 12, by setting/resetting status flag(s) in control register file 20. Similarly, upon servicing a macro-trap, the macro-trap microcode causes mapping of virtual operand register addresses to be redirected back to PORF 22.

Figure 9:
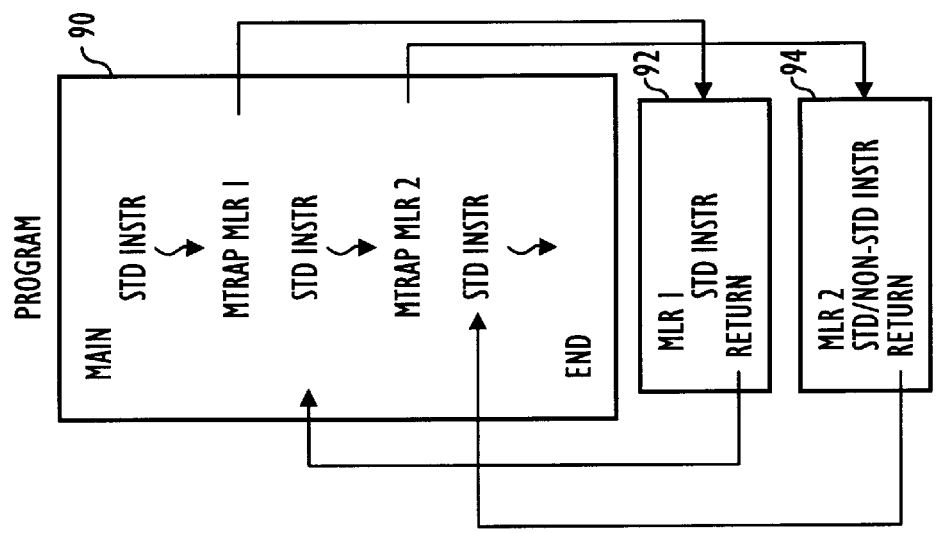

We skip further now to FIG. 9, leveraging AORF 24, macro-trap microcode and second WCSF 30b, with or without also leveraging second AEU's 28b, to efficiently perform a series of frequently performed operations is illustrated. As shown, first and second exemplary MLR's 92 and 94 are provided to complement the main program 90. Exemplary MLR's 92 and 94 comprise first and second series of interruptable frequently performed operations, which may or may not include non-standard instructions that leverage second AEU's 28b. Main program 90 would cause a macro-trap whenever it needed to execute the first/second series of frequently performed operations. In each instance, second WCSF 30b would be made available to IFU 12. AORF 24 would be made available to the appropriate MLR 92 or 94, and execution control would be forked thereto. IFU 12 would fetch instructions of MLR 92 or 94 from second WCSF 30b, and dispatch them to primary execution units 14 and second AEU's 28b as appropriate. MLR 92 or 94 would then perform the interruptable frequently performed operations before returning to main program 90.

Thus, an auxiliary operand register file and complementary arrangements for non-disruptively performing adjunct execution in a processor having a virtually addressable primary operand register file has been described. The enhanced processor is particularly suitable for real-time/DSP systems. Lastly, while the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A processor capable of executing microcode that references operand registers using virtual addresses having n dimensions, n being a positive integer greater than one, the microcode defining a main execution condition and a plurality of adjunct execution conditions, the processor comprising:

a primary operand register file having a first plurality of N operand registers with respective first physical addresses, wherein the total number of virtual addresses in each of the n dimensions is a geometric factor of $N^{1/(n+1)}$;

an auxiliary operand register file having a second plurality of N operand registers with respective second physical addresses, wherein the total number of virtual addresses in each of the n dimensions is a geometric factor of $N^{1/(n+1)}$; and a primary execution unit that executes the microcode and maps the virtual addresses to the first and second physical addresses in response to the microcode, the primary execution unit including:
  selecting means for causing all of the virtual addresses to be mapped to the first physical addresses of the first plurality of operand registers of the primary operand register file during the main execution condition and for causing all of the virtual addresses to be mapped to the second physical addresses of the second plurality of operand registers of the auxiliary operand register file during all of the adjunct execution conditions.

2. The processor as set forth in claim 1, further comprising:

a control register file having a plurality of control registers including a first control register for storing an indicator denoting whether the virtual addresses are to be mapped into the first physical addresses of the first plurality of operand registers of the primary operand register file or second physical addresses of the second plurality of operand registers of the auxiliary operand register file, the selecting means causing all of the virtual addresses to be mapped into the primary operand register file or the auxiliary operand register file according to the contents of the first control register.

3. The processor as set forth in claim 1, wherein the microcode includes basic interrupt/exception microcode for dynamically making the auxiliary operand register file available to an interrupt/exception routine, the the selecting means causing all of the virtual addresses to be mapped into the second physical addresses of the second plurality of operand registers of the auxiliary operand register file, and the primary executing unit forking instruction execution to the interrupt/exception service routine, responsive to an interrupt/exception.

4. The processor as set forth in claim 3, wherein, the basic interrupt/exception microcode is further used to save an exception raising context at the time of invoking the interrupt/exception service routine, by automatically copying the contents of certain of the first plurality of operand registers of the primary operand register file corresponding to the exception raising context into certain of the second plurality of operand registers of the auxiliary operand register file.

5. A processor capable of executing microcode that references virtual operand registers using virtual addresses having n dimensions, n being a positive integer greater than one, the processor comprising:

a primary operand register file having a first plurality of operand registers with respective first physical addresses;

an auxiliary operand register file having a second plurality of operand registers with respective second physical addresses;

a primary execution unit that executes the microcode and selectively maps the virtual addresses to the first physical addresses of the first plurality of operand registers of the primary operand register file during main execution or to the second physical addresses of the second plurality of operand registers of the auxiliary operand register file at least during interrupt/exception servicing;

an auxiliary operand register file stack having a capacity for storing a plurality of auxiliary operand register file frames to facilitate nested interrupt/exception servicing, each of the auxiliary operand register file frames consisting of contents of the second plurality of operand registers; and extended interrupt/exception microcode for pushing an auxiliary operand register file frame onto the auxiliary operand register file stack whenever servicing of a current interrupt/exception is interrupted, and popping a top auxiliary operand register file frame from the auxiliary operand register file stack into the auxiliary operand register file at the end of servicing an interrupt/exception whenever the serviced interrupt/exception preempted an earlier interrupt/exception.

6. The processor as set forth in claim 1, further comprising:

a writable control store facility that stores a plurality of implementor defined micro-trap service routines, each micro-trap service routine comprising a plurality of uninterruptable micro operations, the writable control store facility being normally unavailable to an instruction fetch unit of the processor, and an instruction fetch unit that selectively fetches microcode instructions from one of the writable control store facility and an instruction cache, the instruction fetch unit dispatching the fetched instructions for execution to the primary execution unit, wherein the microcode includes micro-trap microcode that dynamically causes the instruction fetch unit to fetch instructions from the writable control store facility responsive to a micro-trap, the micro-trap microcode being further used for forking instruction execution to one of the micro-trap service routines after causing atomicity of operation to be guaranteed to the particular micro-trap service routine.

7. The processor as set forth in claim 6, wherein, the micro-trap microcode is further used for making the auxiliary operand register file available to the particular micro-trap service routines, the selecting means causing all of the virtual addresses to be mapped to the second physical addresses of the second plurality of operand registers of the auxiliary operand register file, prior to the primary execution unit forking instruction execution to the particular micro-trap service routine, in response to the micro-trap microcode.

8. The processor as set forth in claim 7, wherein, a first subset of the micro-trap service routines is used for emulating a plurality of instructions of other architectures.

9. The processor as set forth in claim 7, further comprising:

an auxiliary execution unit for providing native hardware support to a non-standard underlying operation of a series of micro operations;

wherein the micro-trap microcode is further used for making the auxiliary execution unit directly available to the instruction fetch unit responsive to the micro-trap; and the instruction fetch unit dispatches the non-standard underlying operation from the writable control store facility to the auxiliary execution unit to execute.

10. The processor as set forth in claim 9, wherein, the auxiliary execution unit is a mathematical auxiliary execution unit for performing mathematical calculations of a mathematical function; and a first micro-trap service routine comprising non-standard instruction supported by the mathematical auxiliary execution unit, is used for implementing the selected mathematical function.

11. The processor as set forth in claim 1, further comprising:

a writable control store facility that stores a plurality of implementor-defined macro library routines, each macro library routine comprising a plurality of interruptable operations, and an instruction fetch unit that selectively fetches microcode instructions from one of the writable control store facility and an instruction cache, the instruction fetch unit dispatching the fetched instructions for execution to the primary execution unit, the writable control store facility being normally unavailable to the instruction fetch unit, wherein the microcode includes macro-trap microcode that dynamically causes the instruction fetch unit to fetch instructions from the writable control store facility responsive to a macro-trap, the macro-trap microcode being further used for forking instruction execution to one of the macro library routines.

12. The processor as set forth in claim 11, wherein, the macro-trap microcode is further used for making the auxiliary operand register file available to the particular macro library routines, the selecting means causing all of the virtual addresses to be mapped to the second physical addresses of the second plurality of operand registers of the auxiliary operand register file, prior to the primary execution unit forking instruction execution to the particular macro library routine, in response to the macro-trap microcode.

13. The processor as set forth in claim 11, wherein, a first of the macro library routines is used to switch context.

14. The processor as set forth in claim 11, further comprising:

an auxiliary execution unit for providing native hardware support to a non-standard underlying operation of an interruptable series of operations;

wherein the macro-trap microcode is further used for making the auxiliary execution unit directly available to the instruction fetch unit responsive to the macro-trap; and the instruction fetch unit dispatches the non-standard underlying operation from the writable control store facility to the auxiliary execution unit for execution.

15. The processor as set forth in claim 14, wherein, a first of the macro library routines comprising a non-standard instruction supported by the auxiliary execution unit is used for performing Fast Fourier Transform.

16. The processor as set forth in claim 1, wherein, the processor is a general purpose microprocessor.

17. The processor as set forth in claim 1, wherein, the processor is a digital signal processor.

18. A processor capable of executing microcode that references operand registers using virtual addresses having n dimensions, n being a positive integer greater than one, the processor comprising:

an instruction fetch unit for fetching microcode instructions from an instruction cache; and a writable control store facility storing a plurality of implementor-defined micro-trap service routines, each micro-trap service routine comprising a plurality of uninterruptable micro operations;

wherein the microcode includes micro-trap microcode for dynamically causing the instruction fetch unit to fetch microcode instructions from the writable control store facility rather than the instruction cache responsive to a micro-trap, the micro-trap microcode being further used for forking instruction execution to one of the micro-trap service routines after causing atomicity of operation to be guaranteed to the particular micro-trap service routine.

19. The processor as set forth in claim 18, further comprising:

a primary operand register file having a first plurality of operand registers with respective first physical addresses, an auxiliary operand register file having a second plurality of operand registers with respective second physical addresses, and a primary execution unit that selectively maps the virtual addresses to either the first physical addresses of the first plurality of operand registers of the primary operand register file or to the second physical addresses of the second plurality of operand registers of the auxiliary operand register file; and wherein the micro-trap microcode is further used for dynamically making the auxiliary operand register file available to a particular micro-trap service routine, and forking execution control thereto.

20. The processor as set forth in claim 18, further comprising:

an auxiliary execution unit for providing native hardware support to a non-standard underlying operation of an uninterruptable series of micro operations;

wherein the micro-trap microcode is further used to make available the auxiliary execution unit directly to the instruction fetch unit responsive to the micro-trap; and the instruction fetch unit dispatches the non-standard underlying operation from the writable control store facility to the auxiliary execution unit for execution.

21. A processor capable of executing microcode that references operand registers using virtual addresses having n dimensions, n being a positive integer greater than one, the processor comprising:

an instruction fetch unit for fetching microcode instructions from an instruction cache; and a writable control store facility storing a plurality of implementor-defined macro library routines, each macro library routine comprising a plurality of interruptable operations;

wherein the microcode includes macro-trap microcode for dynamically causing the instruction fetch unit to fetch microcode instructions from the writable control store facility rather than from the instruction cache responsive to a macro-trap, the macro-trap microcode being further used for forking instruction execution to one of the macro library routines.

22. The processor as set forth in claim 21, further comprising:

a primary operand register file having a first plurality of operand registers with respective first physical addresses;

an auxiliary operand register file having a second plurality of operand registers with respective second physical addresses;

a primary execution unit that selectively maps the virtual addresses to either the first physical addresses of the first plurality of operand registers of the primary operand register file or to the second physical addresses of the second plurality of operand registers of the auxiliary operand register file; and wherein the macro-trap microcode is further used for dynamically making the auxiliary operand register file available to a particular macro library routine, and forking execution control thereto.

23. The processor as set forth in claim 21, further comprising:

an auxiliary execution unit for providing native hardware support to a non-standard underlying operation of an interruptable series of operations;

wherein the macro-trap microcode is further used to make available the auxiliary execution unit directly to the instruction fetch unit responsive to the macro-trap; and the instruction fetch unit dispatches the non-standard underlying operation from the writable control store facility to the auxiliary execution unit for execution.

24. A computer system capable of executing microcode that references operand registers using virtual addresses having n dimensions, n being a positive integer greater than one, the microcode defining a main execution condition and a plurality of adjunct execution conditions, the computer system comprising:

a primary operand register file having a first plurality of N operand registers with respective first physical addresses, wherein the total number of virtual addresses in each of the n dimensions is a geometric factor of $N^{1/(n+1)}$;

an auxiliary operand register file having a second plurality of N operand registers with respective second physical addresses, wherein the total number of virtual addresses in each of the n dimensions is a geometric factor of $N^{1/(n+1)}$; and a primary execution unit that executes the microcode and maps the virtual addresses to the first and second physical addresses in response to the microcode, the primary executing unit including:

selecting means for causing all of the virtual addresses to be mapped to the first physical addresses of the first plurality of operand registers of the primary operand register file during the main execution condition and for causing all of the virtual addresses to be mapped to the second physical addresses of the second plurality of operand registers of the auxiliary operand register file during all of the adjunct execution conditions.

25. The computer system as set forth in claim 24, further comprising at least one scalar processing subprogram and a vector processing program, the vector processing program being used to perform vector processing using the primary operand register file, and selectively invoking the at least one scalar processing subprogram to perform adjunct scalar processing using the auxiliary operand register file.

26. A computer system capable of executing microcode that references operand registers using virtual addresses having n dimensions, n being a positive integer greater than one, the computer system comprising:

a primary operand register file having a first plurality of operand registers with respective first physical addresses;

an auxiliary operand register file having a second plurality of operand registers with respective second physical addresses;

a primary execution unit that executes the microcode and selectively maps the virtual addresses to the first physical addresses of the first plurality of operand registers of the primary operand register file during main execution or to the second physical addresses of the second plurality of operand registers of the auxiliary operand register file at least during interrupt/exception servicing; and an auxiliary operand register file stack having a capacity for storing a plurality of auxiliary operand register file frames, to facilitate nested interrupt/exception servicing, each of the auxiliary operand register file frames consisting of contents of the second plurality of operand registers.

27. The computer system as set forth in claim 24, further comprising:

an instruction fetch unit that fetches microcode instructions from an instruction cache and that dispatches the fetched instructions for execution by the primary execution unit; and a writable control store facility that stores a plurality of implementor-defined micro-trap service routines, each micro-trap service routine comprising a plurality of uninterruptable micro operations, the writable control store facility being normally unavailable to the instruction fetch unit and made available to the instruction fetch unit responsive to a micro-trap.

28. The computer system as set forth in claim 27, wherein, a first subset of the micro-trap service routines is used to emulate a plurality of instructions of other architectures.

29. The computer system as set forth in claim 27, further comprising:

an auxiliary execution unit for providing native hardware support to a non-standard underlying operation of an uninterruptable series of micro operations, the auxiliary execution unit is also normally unavailable to the instruction fetch unit, and made directly available to the instruction fetch unit responsive to a micro-trap, the non-standard underlying operation being dispatched by the instruction fetch unit from the writable control store facility to the auxiliary execution unit for execution.

30. The computer system as set forth in claim 29, wherein, the auxiliary execution unit is a mathematical auxiliary execution unit for executing non-standard underlying instructions for performing mathematical calculations of a selected mathematical function; and a first of the micro-trap service routines comprising non-standard underlying instructions, implements the selected mathematical function, utilizing the mathematical auxiliary execution unit.

31. The computer system as set forth in claim 24, further comprising:

an instruction fetch unit that fetches microcode instructions from an instruction cache and that dispatches the fetched instructions for execution by the primary execution unit; and a writable control store facility that stores a plurality of implementor-defined macro library routines, each macro library routine comprising a plurality of interruptable operations, the writable control store facility being normally unavailable to the instruction fetch unit and made available to the instruction fetch unit responsive to a macro-trap.

32. The computer system as set forth in claim 31, wherein, a first of the macro library routines is used to switch context.

33. The computer system as set forth in claim 31, further comprising:

an auxiliary execution unit for providing native hardware support to a non-standard underlying operation of an interruptable series of operations, the auxiliary execution unit is also normally unavailable to the instruction fetch unit, and made directly available to the instruction fetch unit responsive to a macro-trap, the non-standard underlying operation being dispatched by the instruction fetch unit from the writable control store facility to the auxiliary execution unit for execution.

34. The computer system as set forth in claim 33, wherein, the auxiliary execution unit is a Fourier Transform execution unit for executing non-standard underlying instructions for performing Fast Fourier Transform; and a first of the macro library routines comprising non-standard underlying instructions, implements the Fast Fourier Transform, utilizing the Fourier Transform execution unit.

35. A computer system capable of executing microcode that references operand registers using virtual addresses having n dimensions, n being a positive integer greater than one, the computer system comprising:

an instruction fetch unit for fetching and dispatching microcode instructions from an instruction cache; and a writable control store facility storing a plurality of implementor-defined micro-trap service routines, each micro-trap service routine comprising a plurality of uninterruptable micro operations, wherein the microcode includes micro-trap microcode for dynamically causing the instruction fetch unit to fetch microcode instructions from the writable control store facility rather than from the instruction cache responsive to a micro-trap, the micro-trap microcode being further used for forking instruction execution to one of the micro-trap service routines.

36. The computer system as set forth in claim 35, further comprising:

a primary operand register file having a first plurality of operand registers with respective first physical addresses;

an auxiliary operand register file having a second plurality of operand registers with respective second physical addresses; and a primary execution unit that selectively maps the virtual addresses to either the first physical addresses of the first plurality of operand registers of the primary operand register file or the second physical addresses of the second plurality of operand registers of the auxiliary operand register file.

37. The computer system as set forth in claim 35, further comprising:

an auxiliary execution unit for providing native hardware support to an underlying operation of a series of uninterruptable micro operations, the auxiliary execution unit being also normally unavailable to the instruction fetch unit and made directly available to the instruction fetch unit responsive to a micro-trap, the underlying operation being dispatched by the instruction fetch unit from the writable control store facility to the auxiliary execution unit for execution.

38. A computer system capable of executing microcode that references operand registers using virtual addresses having n dimensions, n being a positive integer greater than one, the computer system comprising:

an instruction fetch unit for fetching and dispatching microcode instructions from an instruction cache; and a writable control store facility storing a plurality of implementor-defined macro-trap library routines, each macro-trap library routines comprising a plurality of interruptable operations, wherein the microcode includes macro-trap microcode for dynamically causing the instruction fetch unit to fetch microcode instructions from the writable control store facility rather than from the instruction cache responsive to a macro-trap, the macro-trap being further used for forking instruction to one of the macro library routines.

39. The computer system as set forth in claim 38, further comprising:

a primary operand register file having a first plurality of operand registers with respective first physical addresses;

an auxiliary operand register file having a second plurality of operand registers with respective second physical addresses; and a primary execution unit that selectively maps the virtual addresses to either the first physical addresses of the first plurality of operand registers of the primary operand register file or the second physical addresses of the second plurality of operand registers of the auxiliary operand register file.

40. The computer system as set forth in claim 38, further comprising:

an auxiliary execution unit for providing native hardware support to an underlying operation of a first series of interruptable operations, the auxiliary execution unit being also normally unavailable to the instruction fetch unit and made directly available to the instruction fetch unit responsive to a macro-trap.

\* \* \* \* \*